June 30, 1931.   J. T. LALLY   1,812,794
NOZZLE
Filed April 17, 1930
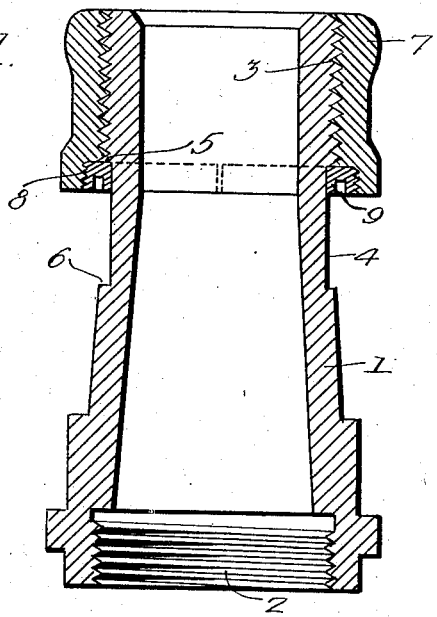
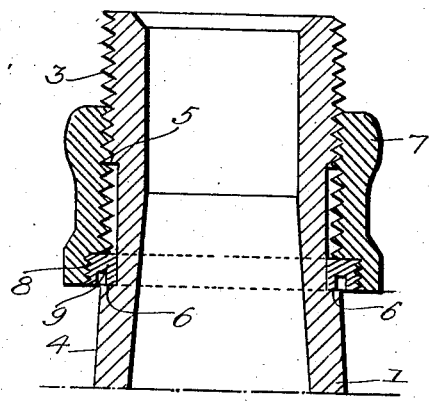
Inventor:
John T. Lally
by his Attorneys
Howson & Howson Patented June 30, 1931

1,812,794

UNITED STATES PATENT OFFICE

JOHN T. LALLY, OF WILMINGTON, DELAWARE

NOZZLE

Application filed April 17, 1930. Serial No. 445,006.

This invention relates to improvements in nozzles and like fixtures, and the principal object of the invention is to provide a nozzle having an externally threaded extremity for coupling purposes, together with novel means for guarding said threads from injury during periods of disuse, and means for locking said guard means in position to prevent accidental displacement.

In the attached drawings:

Figure 1 is a sectional view of a nozzle made in accordance with my invention showing the guard in the advanced or active position; and Fig. 2 is a fragmentary sectional view showing the guard retracted.

With reference to the drawings, my nozzle in a preferred form comprises a substantially tubular body member 1, said body in the present instance being internally threaded at its base end, as indicated at 2, and at its other or outer end being externally threaded, as indicated at 3, to permit coupling thereto of a hose or other duct. Immediately adjacent the threaded section 3, the body 1 is externally and circumferentially recessed, this recess 4 being bounded at one side by a shoulder 5 where the threaded portion 3 terminates and at the other end with a corresponding but opposite shoulder 6.

In accordance with the present invention, I provide a sleeve 7 which is adapted for threaded engagement with the external threads 3 of the body member and is sufficiently long, as illustrated in Fig. 1, to entirely embrace this threaded section of the body member to afford complete protection thereto. At its inner end, the sleeve 7 is internally threaded, as indicated at 8, for reception of a threaded divided ring 9 which in assembly is carried by the sleeve 7, as illustrated. By reason of the ring 9 being divided, the parts are readily assembled.

The ring 9, as will be apparent, when threaded into the inner end of the sleeve 7 constitutes a stop coactive with the shoulders 5 and 6 to limit the movement of the sleeve 7 in both directions. By abutment with the shoulder 5, the ring limits the movement of the sleeve outwardly and prevents removal thereof unless or until the said ring is unthreaded from the sleeve. By engaging the shoulder 6 of the body member, the ring 9, as illustrated in Fig. 2, limits the retractive movement of the sleeve. The ring also functions after the manner of a lock nut to retain the sleeve 7 either in the extreme advanced on in the retracted position, thereby preventing accidental displacement.

I claim:

1. A nozzle comprising a body member having an externally threaded terminal portion, a sleeve having threaded engagement with said terminal portion and means permitting movement of said sleeve inwardly on the body portion to uncover at least a portion of the said terminal, an annular element threaded into the inner end of and normally carried by said sleeve, and a shoulder on said body member positioned to engage said element to limit the advance movement of the sleeve, said ring constituting also a lock nut for securing the sleeve in the advanced position.

2. A nozzle comprising a tubular body member having an externally threaded extremity, a sleeve threaded on said extremity embracing the same and arranged to be turned inwardly on the body member to expose the threads of the latter for terminal purposes, an element threaded into said sleeve and normally carried thereby, and an abutment for said element on the body member whereby said threaded member constitutes both a stop limiting the outward movement of the sleeve and a lock nut for securing the sleeve in the outer terminal position.

3. A nozzle comprising a tubular body member having an externally threaded extremity and a circumferentially recessed portion of lesser external diameter than the said threaded extremity, a protective sleeve threaded on said extremity, and sleeve-retaining means in the form of a divided annulus threaded into an end of the sleeve and projecting into the said body recess.

4. A nozzle comprising a tubular body member having an externally threaded extremity and a portion of lesser external diameter than the said extremity, a protective sleeve threaded on said extremity, and sleeve-retaining means in the form of a divided annulus threaded into the end of the sleeve, the inner diameter of said annulus being less than the external diameter of the threaded portion and embracing the body portion of lesser external diameter.

JOHN T. LALLY.